(12) United States Patent
Park et al.

(10) Patent No.: US 6,477,012 B1
(45) Date of Patent: Nov. 5, 2002

(54) FLYING NEGATIVE PRESSURE AIR BEARING SLIDER WITH DUAL NEGATIVE PRESSURE POCKETS AND SIDE TRANSDUCER

(75) Inventors: Ki-Ook Park, Cupertino, CA (US); Keung Youn Cho, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/489,015

(22) Filed: Jan. 21, 2000

Related U.S. Application Data (63) Continuation-in-part of application No. 09/025,502, filed on Feb. 18, 1998, now Pat. No. 6,055,129.

(51) Int. Cl.⁷ .................................................. G11B 5/60
(52) U.S. Cl. .................................................. 360/236.1
(58) Field of Search ...................................... 360/236.1

(56) References Cited

U.S. PATENT DOCUMENTS

| 5,650,892 A | * | 7/1997 | Dorius et al. | 360/235.6 |
| 5,650,893 A | * | 7/1997 | Bolasna et al. | 360/236.1 |
| 5,872,685 A | * | 2/1999 | Park et al. | 360/236.1 |

* cited by examiner

*Primary Examiner*—George J. Letscher
(74) *Attorney, Agent, or Firm*—Volentine Francos, PLLC (57) ABSTRACT

An air bearing slider that flies above a surface of a recording disk during relative rotation of the recording disk. A plurality of projections extend along the side of the slider body, and a plurality of negative pressure air cavities are formed between the projections. The projections act as pneumatic bearings, creating supporting positive forces for supporting the slider. The negative pressure air cavities create negative forces for pulling the slider down. The positive and negative forces on the center of mass of the slider are balanced to provide a more stable, static, and dynamic flying attitude for the slider. The resulting pressure profile of the slider has high pressure near the leading end, relatively low pressure in the middle, and relatively high pressure near the trailing end. This ensures minimum spacing between the slider and the disk that is very insensitive to roll parameters.

21 Claims, 8 Drawing Sheets

Fig. 1A

Prior Art

Fig. 1B

Prior Art

FLYING NEGATIVE PRESSURE AIR BEARING SLIDER WITH DUAL NEGATIVE PRESSURE POCKETS AND SIDE TRANSDUCER

This application relies for priority upon as a continuation-in-part of U.S. patent application Ser. No. 09/025,502 filed on Feb. 18, 1998, now U.S. Pat. No. 6,055,129 directed to a "FLYING NEGATIVE PRESSURE AIR BEARING SLIDER WITH DIVIDED NEGATIVE PRESSURE POCKETS," the contents of which are herein incorporated by reference in their entirety.

BACKGROUND OF THE INVENTION

1. Field of the Invention

The present invention relates to magnetic recording devices, specifically, to air bearing sliders for use in a magnetic recording drive. In particular, the present invention relates to a method and apparatus for providing stronger and more broadly distributed negative pressure by using dual cross bars. This invention provides for a stable, static, and dynamic flying attitude with a compensating slider size reduction and a wide variation of skew angles.

2. Description of the Related Art

Magnetic recording systems transfer data through transducers that are supported by an air bearing film or layer as they move relative to the surface of a magnetic recording disk. Such transducers need to either "fly" at just a few micro-inches above a rotating disk surface (flying-type heads), or contact the rotating disk slightly within a safe range of contact pressure (pseudo contact-type heads). The air bearing film is produced by the pressurization of air as it flows between the rotating disk surface and the magnetic head assembly (also called the slider body).

For flying magnetic head assemblies, or flying heads, the air bearing functions to provide, without physical contact, a very thin clearance between the magnetic head assembly and the rotating disk. This minimizes the surface wear and damage to the flying head and the magnetic disk during operation, while maintaining a close separation to ensure a high density magnetic recording structure.

Flying heads thus provide a non-contact transducing mechanism between a magnetic transducer and a fast rotating recording medium. However, to obtain the best data transfer performance without causing serious tribological problems, this requires that a stable, constant spacing be maintained between a flying transducer (on the slider body) and the magnetic recording disk.

As the nominal flying height (the distance between the slider body and the rotating disk surface) of the flying slider decreases, the magnetic transducer achieves a higher resolution between individual data bit locations on the disk. Thus, a close space between the flying slider and the rotating disk, coupled with a very narrow transducer gap and a very thin magnetic recording film, allows for a higher recording capacity with very short wavelength and high frequency features. A constant spacing between the flying head slider body and the disk also minimizes the fluctuations in signal amplitude, thereby optimizing signal resolution. Finally, a constant low flying height over whole data area is the essential factor for an optimized higher density recording process regardless of skew angle variation and increasing rotating disk speed.

Therefore, to achieve a higher recording density the flying height must be reduced as much as possible without causing reliability problems. Problems can occur, however, when excessive and unwanted variations in the flying height result in contact between the flying slider and the rapidly rotating recording medium. Any such contact leads to wear of the slider and the recording surface, and in certain conditions, can be catastrophic to the operation of the disk drive.

Accordingly, development efforts continue to strive for lower and lower flying heights while trying to provide uniform or optimum flying height conditions across a range of flying conditions. Some tactics that are used are tangential velocity variations from the inside to the outside tracks and high speed track seeking movement.

Another way to achieve a high-speed access rate for stored data and to obtain a smaller drive size, is through the use of a rotary actuator rather than a linear actuator. By using a rotary actuator, the airflow under the slider is no longer substantially unidirectional, but varies widely in angle with respect to the longitudinal axis of the slider. The angle of the airflow with respect to the longitudinal axis of the slider is called the skew angle. In accessing the magnetic disks for recording, and playing back from disks using a rotary type actuator, the magnetic transducer continuously experiences air velocity and skew angle variations while moving from one data track to another data track of the disk in response to commands from a VCM controller. Large amount of skew angle and fast accessing movement of rotary actuator can cause a severe reduction of flying height, especially at inner and outer tracks.

Disk circumferential speed increases linearly from the inner diameter (ID) to the outer diameter (OD) of the rotating disk. Because a slider typically flies higher as the velocity of the disk recording medium increases, there is a tendency for the slider's outer rail to fly higher than the inner rail. Therefore, the flying slider has a structure that ensures that a roll angle can be generated in an attempt to counteract the tendency of the outer rail to fly higher than the inner rail. The roll angle is defined as the tilt angle between the principal plane of the slider in the radial direction of the disk and the principal plane of the disk surface.

The ability to control or generate changes in the roll angle are important to counteract other forces generated during disk drive manufacture or operations. Some of these forces or factors that must be compensated for include: manufacturing errors in the gimbals which attach the slider to the suspension arm; dynamic forces applied to the air bearing slider by the track accessing arm during tracking accessing; and varying skew angles tangential to the disk rotation as measured from the slider center line.

For example, regardless of the particular skew angle with respect to the direction of air flow, unequal pressure distribution develops between the outer and inner side rails. This causes the slider to fly with the inner rail much closer to the disk surface than the outer rail. As a result, the probability of physical contact with the disk surface at this slider's minimum flying height increases. Therefore, there is a continuing effort to develop air bearing sliders that carry a transducer as close to the disk surface as possible with a constant flying height and roll angle regardless of the varying flying conditions such as disk velocity and skew angle variation.

Air bearing sliders used in disk drives also typically have a leading edge (a front portion) and a trailing edge (a rear portion). Generally, the sliders have tapered or shallowly-etched portions at the leading edge to lift up slider by squeezing incoming air, and longitudinal air bearing rails that extend from the leading edge all or part way to the trailing edge. Airflow is developed in the direction on the disk surface and applied to cause the flying head slider to float off the rotating disk surface against the resiliency of the suspensions. Pitch angle is introduced through the fact that the flying height of the leading edge is generally different from that of the trailing edge. The pitch angle is defined as the tilt angle between the principal plane of the slider body in the tangential direction of the rotating disk and the principal plane of the disk surface.

The pitch angle is positive in the normal case in which the flying height of the trailing edge of the slider is lower than that of the leading edge of the slider. This is the preferred state for stable head flying. When the leading edge flying height is lower than the trailing edge flying height, however, the slider has a negative pitch angle, which can cause unstable head flying. In particular, with such a negative pitch angle, the possibility exists that there could be sudden physical contact between flying head and rotating medium.

Furthermore, if the designed positive pitch angle is too small, the possibility exists that the slider will dip down or inadvertently transition to a negative pitch angle orientation, caused by internal or external interference, for example, and the leading edge of the slider may hit the rotating disk. On the other hand, if the designed pitch angle is too large, the air stiffness needed for stable flying can be disadvantageously reduced, which may also result in a collision with the disk. Therefore, to maintain stability while avoiding the negative pitch angle situation, the slider should be configured such that the pitch angle can be controlled to fall within an optimum range.

Another factor to consider regarding pitch angle is the general tendency for the pitch angle to increase when the skew angle increases as the slider is positioned nearer to the outer diameter of the disk. Thus the pitch angle should fall within a safe range regardless of the skew angle variations to ensure the desired dynamic performance reliability of the head/disk interface.

A small pressure difference is generated beneath inner and outer side rails of the flying slider even with a zero skew angle condition, because of a small difference in the linear velocity of the disk at the two different locations beneath the two rails. Thus, even without skew, this pressure difference between two side-rails makes the slider roll slightly. Also, the skew-angle of the airflow further causes the slider to roll even more, such that the flying height is not uniform under all of the rails.

In a disk drive, a positive roll occurs when the inner rail rolls away from the disk surface, while a negative roll occurs when the inner rail rolls toward the disk surface. When roll lowers a corner of the slider, the possibility is increased that the head will come into contact with the disk surface. Also, a roll that raises one corner of the slider can increase the distance of the read and write heads from the disk surface, making data errors in the same manner that increasing the fly height of the slider causes data errors. Finally, the variation in roll angle as a function of actuator skew needs to be substantially reduced or eliminated to achieve a stable flying attitude and a reliable data transfer between head and media. Transducers are generally located at the trailing edge of the outer rail, and so, to achieve a desirably low flying height for the transducer, it is necessary to design the system such that it has a positive roll angle condition over the entire data range. This can be seen in FIGS. 1A and 1B, which are rear views of a head and transducer, showing different roll angles.

Figure 1A:
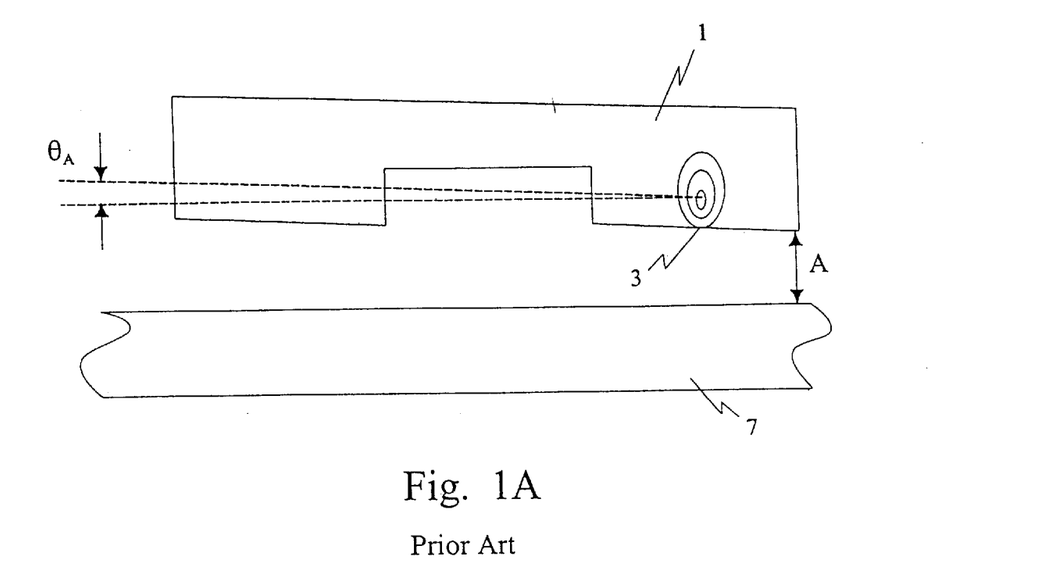
FIGS. 1A and 1B are rear views of a head and transducer, showing different roll angles.
Figure 1B:
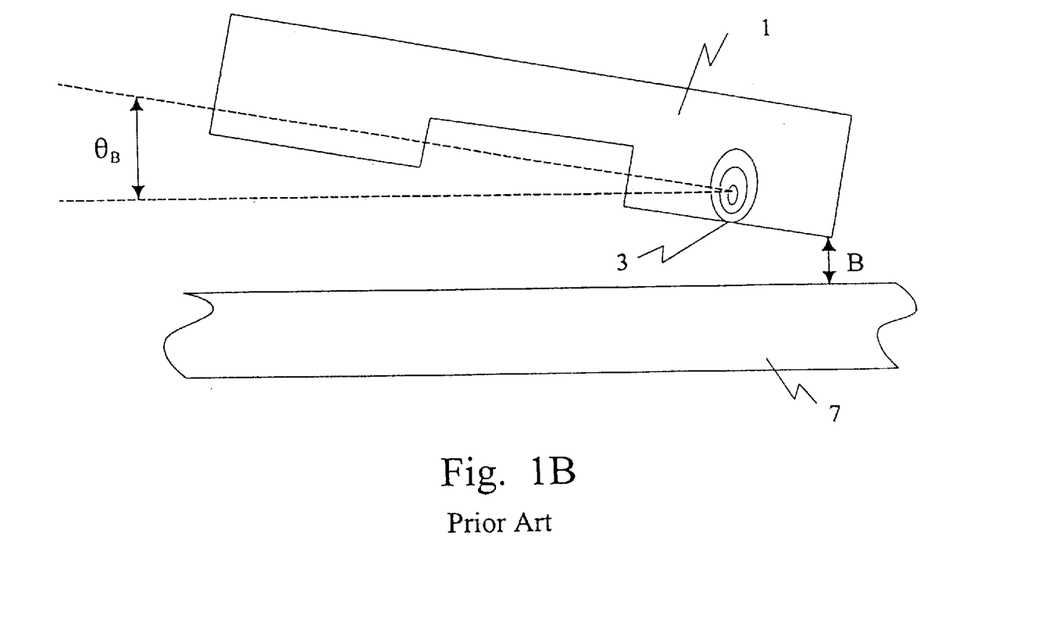

As shown in FIGS. 1A and 1B, a head 1 and transducer 3 are provided for reading information from a disk 7. FIG. 1A shows a rear view of the head 1 and transducer 3 when they experience a small roll angle. FIG. 1B shows a rear view of the head 1 and transducer 3 when they experience a large roll angle. In each case, the head 1 and transducer 3 have a minimum flying height that indicates how close the head 1 and transducer 3 get to the surface of the disk 7.

When there is a small roll angle $\theta_A$, as shown in FIG. 1A, the head 1 and transducer 3 maintain a minimum flying height of A. However, where there is a large roll angle $\theta_B$, as shown in FIG. 1B, the head 1 and transducer 3 maintain a minimum flying height of B. If the transducer 3 in both FIGS. 1A and 1B has the same transducer flying height, the minimum flying height A will be larger than the minimum flying height B, as a function of the difference in their roll angles.

During the high-speed rotation of a hard disk associated with the flying head slider, a suitable airflow is produced through an air viscosity effect and is applied to support the flying head slider. The flying head slider moves from an innermost disk region to an outermost disk region with a rotary actuator. As the skew angle of the flying head slider progressively changes, and the direction of the airflow progressively increases, a negative pressure is developed in the control grooves in proportion to the linear velocity. Consequently, the flying head slider remains floating off the disk surface safely by a small distance over the full disk surface range. Different slider geometry types have different gas bearing characteristics.

Figure 2:
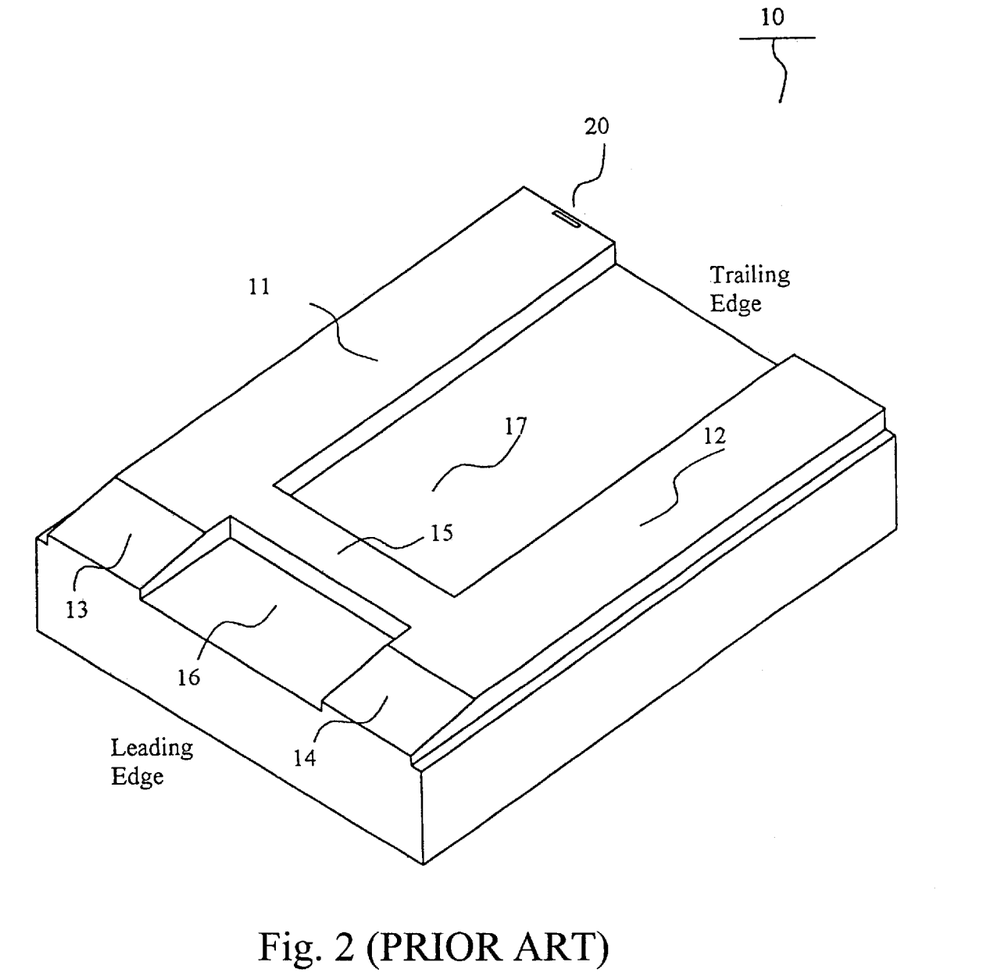
FIG. 2 is a bottom perspective view illustrating a conventional negative pressure air bearing (NPAB) slider for use in a magnetic recording disk drive.

FIG. 2 is a schematic perspective view of a conventional a negative pressure air bearing (NPAB) flat slider. This conventional slider 10 includes a slim hexahedron body 5, outer and inner rails 11 and 12, outer and inner tapered or sloped portions 13 and 14, a cross bar (or cross rail) 15, a forward cavity 16, and a negative, or sub-ambient, pressure cavity 17. A transducer 20 is preferably mounted at the rear portion of the outer rail 11 with reference to the disk rotation The outer and inner rails 11 and 12 are formed in parallel at a predetermined height on the surface of the slim hexahedron body 5 to form lengthwise extending air bearing surfaces (ABS's). These rails 11 and 12 extend lengthwise from a leading edge portion, or front, of the slider 10 to a trailing edge portion, or rear, of the slider 10, with respect to the direction of disk rotation. The outer and inner sloped portions 13 and 14 are respectively formed at each leading edge portion of the outer and inner rails 11 and 12. The cross bar 15 has the same height as the outer and inner rails 11 and 12, and is formed between the outer and inner rails 11 and 12 near the leading edge between the rails 11 and 12 proximate to the sloped portions 13 and 14. The forward cavity 16 is formed by the cross bar 15, the outer and inner rails 11 and 12, and the outer and inner sloped portions 13 and 14, and faces the forward portion of the slider 10. The negative pressure cavity 17 is formed by the cross bar 15 and the outer and inner rails 11 and 12, and faces the rear portion of the slider 10.

In this conventional design, air within a very thin boundary layer rotates together with the rotation of the disk due to surface friction. The disk drags air under the slider 10 and along the air bearing surfaces in a direction approximately parallel to the tangential velocity of the disk. When passing between the rotating disk and the slider 10, the air is compressed by the ramps 13 and 14 on the leading edge of the rails 11 and 12. This pressure creates a hydrodynamic lifting force at the ramp section which is sustained along each of the rails 11 and 12, resulting in a lifting force that allows the slider 10 to fly over the disk surface. In this way, the side rails 11 and 12 function as pneumatic bearings, and thus form a positive pressure region for the slider 10 at a portion along an axis of an air flow generated by a rotation of the magnetic disk.

The cross bar 15, in conjunction with the side rails 11 and 12, creates the negative pressure cavity 17 in proximity to the central surface portion of the body 5 and downstream of the cross bar 15. Since the pressure of the air passing over the cross bar 15 is diffused as it passes the negative pressure cavity 17, a pulling or suction force is downwardly applied on the slider which reduces the suspension gram load, or suspension force, i.e., the downward force applied by the suspension of the slider 10, and provides the advantage of a fast take off from the disk surface.

Figure 3A:
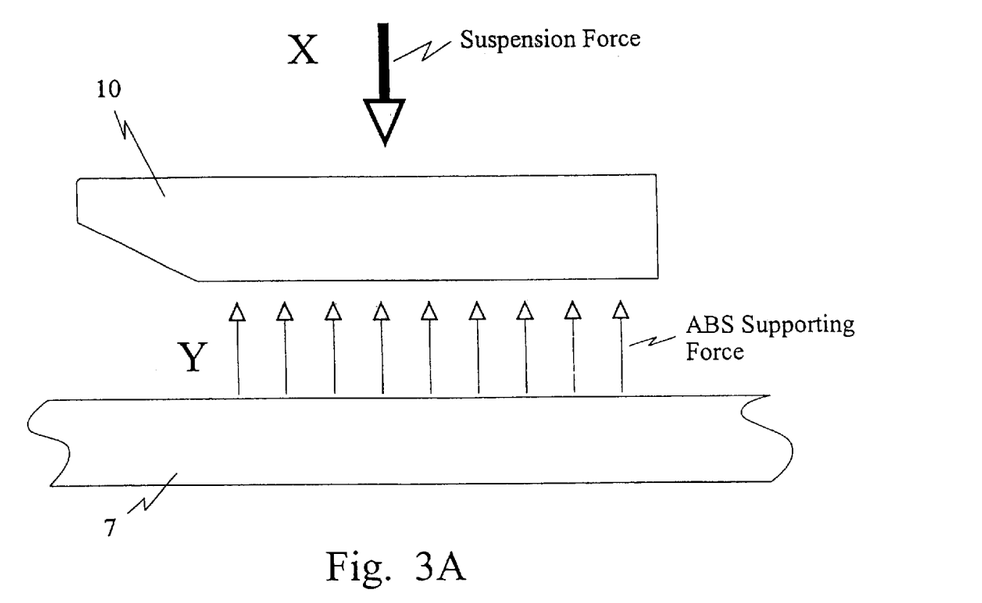
FIG. 3A is a side view showing the forces working on a slider without a negative pressure cavity as it passes over a disk.
Figure 3B:
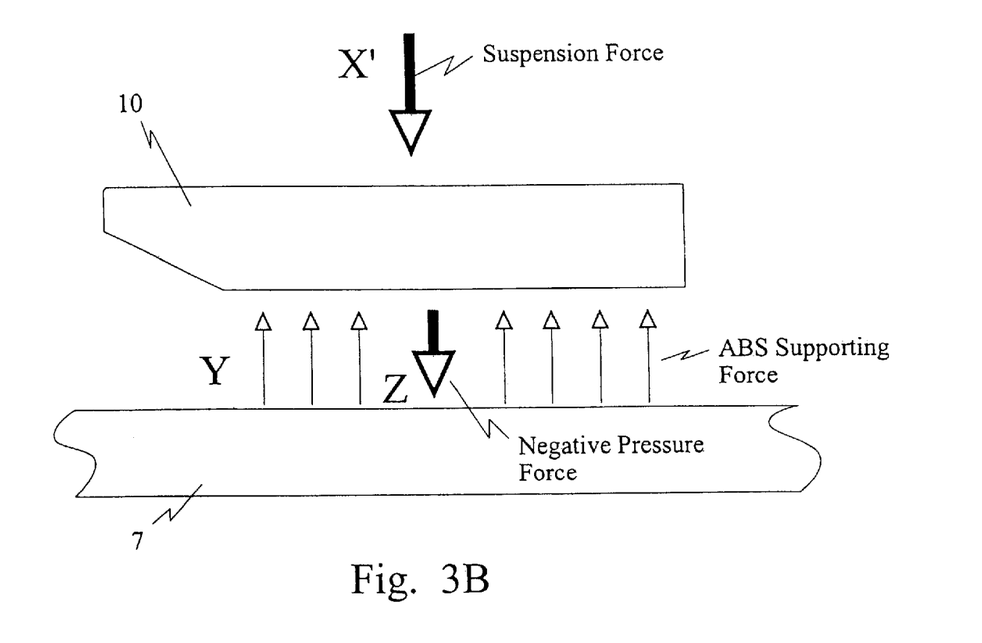
FIG. 3B is a side view showing the forces working on a slider with a negative pressure cavity as it passes over a disk.

The operation of forces on the slider 10 both with and without a negative pressure cavity is shown in FIGS. 3A and 3B. FIG. 3A shows the case without a negative pressure cavity and FIG. 3B shows the case with a negative pressure cavity. In each instance, for a slider 10 to maintain a substantially constant height over a disk 7, the upward and downward forces must be equal.

As shown in FIG. 3A, when the slider does not have a negative pressure cavity, the downward pressure comes from a first suspension gram load, or first suspension force X, and the upward pressure comes from an air bearing surface (ABS) supporting force Y, caused by the hydrodynamic lifting force created by air-bearing surfaces.

As shown in FIG. 3B, when the slider does have a negative pressure cavity, the downward pressure comes from both a second suspension force X' and a negative pressure force Z created by the suction caused by the negative pressure cavity. The upward pressure continues to come from the ABS supporting force Y, as in FIG. 3A.

If the ABS supporting force Y remains the same in the sliders 10 in FIGS. 3A and 3B, then the first suspension force X must equal the sum of the second suspension force X' plus the negative pressure force Z. As a result, the suspension force, or suspension gram load, can be reduced through the use of a negative pressure cavity.

The counter action between the positive and negative forces caused by the side rails 11 and 12, and the negative pressure cavity 17 reduces the sensitivity of the slider flying height relative to disk velocity and increases the slider stiffness characteristics. This suspension load reduction can bring significant improvement for conventional contact start stop (CSS) performance.

However, the NPAB slider of FIG. 2 does suffer some drawbacks. For example, the amount of negative pressure in the a negative pressure cavity 17 is dependent upon the air flow direction, meaning that differing pressures will exist at differing skew angles. This results in a non-uniform operation along the full diameter of the disk. In particular, higher skew angles may cause more severe negative roll fluctuations compared to conventional tapered flat slider. Also, there is a tendency for debris to gather at the cross-rail 150 in the forward cavity 16. Such debris can ultimately have an adverse effect on performance since the accumulated particles may cause head crashes and undue wear of the head and disk.

In order to achieve more the stable and lower flying height required to get higher density recording without causing several tribological problems, the slider size itself needs to be optimized. In order to obtain a faster data transfer rate, the disk rotation speed needs to be faster and the movement of flying head itself needs to be sped up, while retaining a constant data handling reliability. To simultaneously satisfy these requirements, the air bearing shape of flying slider needs to be continuously improved.

In this invention, a novel slider design with a more enforced and well-distributed negative pressure around central cavity sections is introduced as a suitable candidate for the purpose of achieving higher density and better performance. Statically and dynamically stable flying attitude with smaller slider size and lower flying height has been successfully obtained through this invention.

SUMMARY OF THE INVENTION

An object of this invention is to provide a negative pressure air bearing slider that experiences minimal changes in flying height and pitch angle and roll angle over a broad range of velocity and skew angle variations in a disk drive system.

Another object of the invention is to provide a negative pressure air bearing slider that experiences constant and stable air bearing stiffness with large skew angle variations in a disk drive system.

Another object of the invention is to provide a negative pressure air bearing slider that shows minimized particle accumulation on the whole air bearing surface without sections showing drastic air flow change.

A further object is to provide a negative pressure air bearing slider that exhibits smaller sensitivity to external disturbances and environmental changes with a well-balanced force and momentum equilibrium condition for a flying slider.

In accordance with these objects of the invention, a negative pressure air bearing (NPAB) slider is provided, including a slider body for flying above a surface of a recording disk during relative rotation of the recording disk, the slider body having a principal surface for confronting the disk surface, the principal surface having a lead portion, a rear portion, a first side portion and a second side portion, wherein the lead portion is spaced upstream of the rear portion relative to a longitudinal direction of the slider body which is coincident with a tangential rotational direction of the recording disk, and wherein the first side portion is spaced from the second side portion relative to a lateral direction of the slider body. The NPAB slider also includes first and second projections extending from the lead portion of the principal surface of the slider to a midpoint of the slider, the first and second projections being spaced apart from each other in the lateral direction of the slider body, a first cross bar formed between the first and second projections, third and fourth projections extending from the midpoint of the principal surface of the slider to the rear portion of the slider, the third and fourth projections being spaced apart from each other in the lateral direction of the slider body, and a second cross bar formed between the third and the fourth projections. The first cross bar and the first and second projections define a first negative pressure air cavity for the slider body, and the second cross bar and the third and fourth projections define a second negative pressure air cavity for the slider body.

The NPAB slider may also comprise first and second slanted walls, the first slanted wall being formed between the second cross bar and the third projection, and the second slanted wall being formed between the second cross bar and the fourth projection. The second cross bar, the first and second slanted walls, and the third and fourth projections define a second negative pressure air cavity for the slider body. The second cross bar and the first and second slanted walls preferably form a convex shape, with respect to the lead portion of the slider.

The NPAB slider may also comprise a central shallowly-etched step formed proximate to the lead portion of the slider, the central shallowly-etched step having a height less than that of the first and second projections.

The first cross bar may have a first air channel formed in it to allow air to flow from the lead portion of the slider to the first negative pressure air cavity. Similarly, the second cross bar may have a second air channel formed in it to allow air to flow from the first negative pressure air cavity to the second negative pressure air cavity.

The first and third projections preferably define a third air channel from the first negative pressure air cavity to the first side portion, and the second and fourth projections preferably define a fourth air channel from the first negative pressure air cavity to the second side portion.

The first cross bar may be shallowly etched to regulate the flow of air from the lead portion to the first negative pressure air cavity. Likewise, the second cross bar may be shallowly etched to regulate the flow of air from the first negative pressure air cavity to the second negative pressure air cavity.

Also in accordance with the objects of this invention, a negative pressure air bearing (NPAB) slider, is provided, including a slider body for flying above a surface of a recording disk during relative rotation of the recording disk, the slider body having a principal surface for confronting the disk surface, the principal surface having a lead portion, a rear portion, a first side portion and a second side portion, wherein the lead portion is spaced upstream of the rear portion relative to a longitudinal direction of the slider body which is coincident with a tangential rotational direction of the recording disk, and wherein the first side portion is spaced from the second side portion relative to a lateral direction of the slider body.

The NPAB slider also includes first and second primary projections extending from the lead portion of the principal surface of the slider to the rear portion of the slider, the first and second primary projections being spaced apart from each other in the lateral direction of the slider body, the first and second primary projections each including a front section proximate to the lead portion, a rear section proximate to the rear portion, and a middle section between the front and rear sections, the middle section being more narrow than either of the front or rear sections, and a primary cross bar placed between the front sections of the first and second primary projections.

The NPAB slider also includes first and second secondary projections, being smaller in length than the first and second primary projections, being spaced apart from each other in the lateral direction of the slider body, and being placed proximate to the middle sections of the first and second primary projections, and a secondary cross bar placed between the first and second secondary projections, in the direction facing the lead portion. A transducer is mounted on one of the first and second projections so as to be suspended over the disk surface while the disk is rotating. The primary cross bar and the first and second primary projections define a primary negative pressure air cavity for the slider body, while the secondary cross bar and the first and second secondary projections define a secondary negative pressure air cavity for the slider body.

The secondary cross bar is preferably convex with respect to the lead portion of the slider.

The NPAB slider may also comprise a central shallowly-etched step, having a height less than that of the first and second projections, formed proximate to the lead portion of the slider.

The transducer is preferably mounted on the rear section of one of the first and second projections.

The primary cross bar preferably has a primary air channel formed in it to allow air to flow from the lead portion of the slider to the primary negative pressure air cavity. Similarly, the secondary cross bar has a secondary air channel formed in it to allow air to flow from the primary negative pressure air cavity to the secondary negative pressure air cavity.

The first primary projection and the first secondary projection preferably define a first air channel from the primary negative pressure air cavity to the rear portion, while the second primary projection and the second secondary projection preferably define a second air channel from the first negative pressure air cavity to the rear portion.

The primary cross bar can be shallowly etched to regulate the flow of air from the lead portion to the primary negative pressure air cavity. Likewise, the secondary cross bar may be shallowly etched to regulate the flow of air from the primary negative pressure air cavity to the secondary negative pressure air cavity.

In accordance with the objects of this invention, a negative pressure air bearing slider is also provided that includes a slider body, for flying above a surface of a recording disk during relative rotation of the recording disk, the slider body having a lead portion and a rear portion, first and second projections formed on the slider body, the first and second projections being spaced apart from each other in a lateral direction of the slider body, and providing a plurality of supporting forces to support the slider over the disk, a first cross bar formed between the first and second projections, a first negative pressure air cavity proximate to the lead portion for providing a first negative force, pulling down the slider towards the disk, a second negative pressure air cavity proximate to the rear portion for providing a second negative force, pulling down the slider towards the disk, and a transducer mounted on one of the first and second projections so as to be suspended over the disk surface while the disk is rotating.

The plurality of positive forces and the first and second negative forces are preferably balanced around the center of mass of the slider to keep the slider at a constant height over the disk.

BRIEF DESCRIPTION OF THE DRAWINGS

For a better understanding of the present invention, features and advantages of the present invention will be apparent from the following detailed description of the selected embodiments of the invention, reference being made to the accompanying drawings in which.

DETAILED DESCRIPTION OF THE PREFERRED EMBODIMENTS

Figure 4:
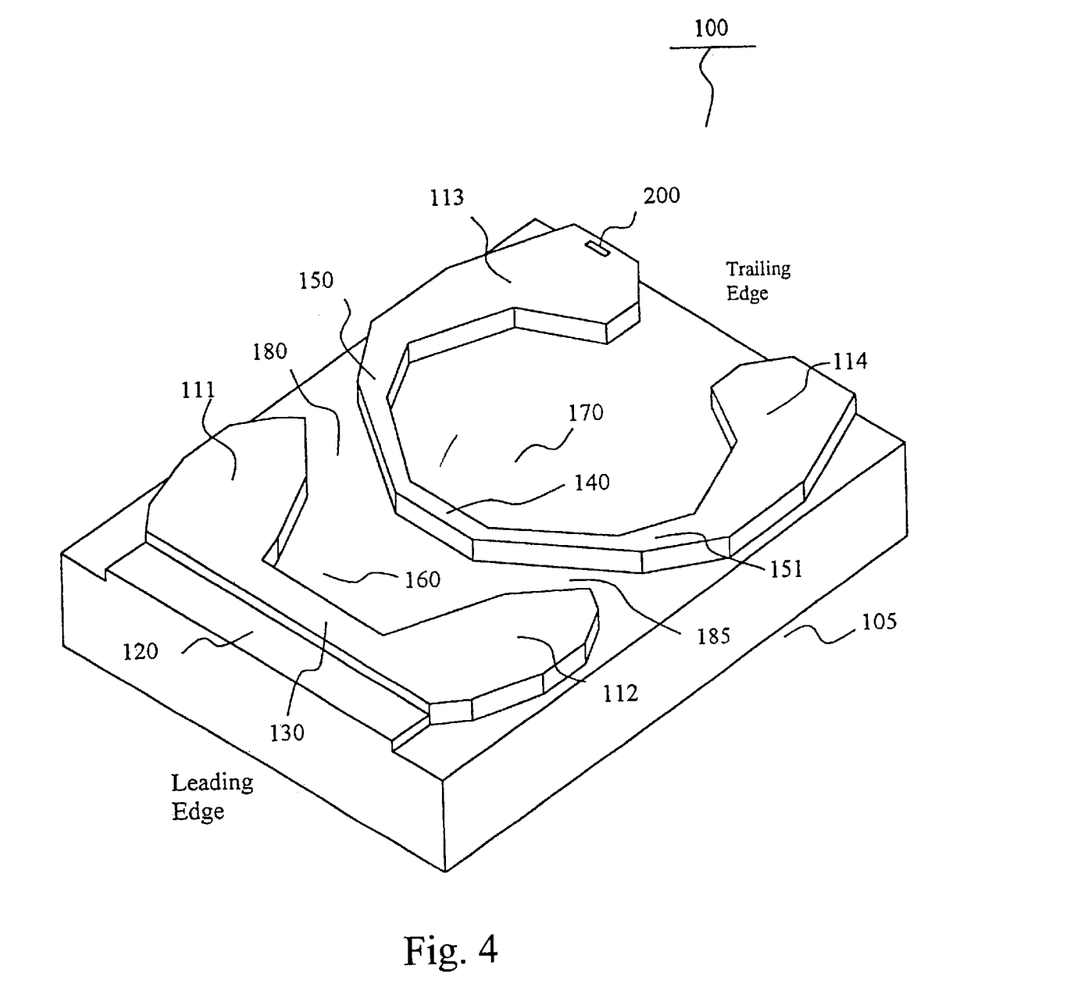
FIG. 4 is a bottom perspective view illustrating a negative pressure air bearing (NPAB) slider according to a first preferred embodiment of the present invention.

The present invention is generally directed to a flying air bearing slider with dual negative pressure pockets or cavities. FIG. 4 is a bottom perspective view of an improved flying negative pressure air bearing (NPAB) slider in accordance with a first preferred embodiment of the present invention.

The following discussion is conducted with the understanding that the flying air bearing slider flies above a surface of a recording disk during relative rotation of the recording disk. The slider body has a principal surface, confronting the disk surface, on which a pattern of rails and recesses are formed. The principal surface has a leading edge (a lead portion), a trailing edge (a rear portion), a first side, and a second side. The leading edge is spaced upstream of the trailing edge relative to a longitudinal direction of the slider body, which is coincident with the tangential rotational direction of the recording disk. The first side is spaced from the second side relative to a lateral direction of the slider body.

In accordance with the first preferred embodiment of the present invention, the slider 100 includes a slider body 105, first through fourth side rails 111 and 112, 113, and 114, a central shallowly-etched step 120, first and second cross bars (or cross rails) 130 and 140, first and second slanted walls 150 and 151, first and second separated negative pressure zones 160 and 170, and first and second air channels 180 and 185. A transducer 200 is preferably mounted on the rear portion of the third side rail 113 so as to pass over the recording disk during flight of the slider 100.

The first through fourth side rails 111, 112, 113, and 114 are formed as lead and rear pairs of substantially coplanar side rails. The first and second side rails 111 and 112 are formed along a length of the slider body 105, on opposite sides, from a lead portion to a midpoint of the slider 100. Similarly, the third and fourth side rails 113 and 114 are formed along a length of the slider body 105, on opposite sides, from a the midpoint to the rear portion of the slider 100. The first side rail 111 is preferably separated from the third side rail 113 by the first air channel 180, which is located at the midpoint of the slider 100. Similarly, the second side rail 112 is preferably separated from the fourth side rail 114 by the second air channel 185, which is also located at the midpoint of the slider 100.

When the term midpoint is used here, it refers to an arbitrary position between the lead portion and the rear portion. The midpoint need not be at a point equidistant from the lead portion and the rear portion, but can be at any suitable point between them.

The first cross bar 130 is located between the front pair of side rails 111 and 112 towards the lead portion of the slider 100. The second cross bar 140 is located between the rear pair of side rails 113 and 114, also towards the lead portion of the slider 100. The second cross bar 140 is smoothly connected to the third and fourth side rails 113 and 114 by the first and second slanted walls 150 and 151, such that a convex shape is formed with respect to the lead portion of the slider 100.

The central shallowly-etched step 120 is preferably formed at the leading edge of slider 100 and operates to squeeze incoming air and initiate the lifting force. As a result, during operation, the total ABS area can thus be sufficiently formed to make the designated flying height. This is important because if the flying height is too low, it can cause several tribological problems that are bad for head reliability. Likewise, if the flying height is too great, it can result in the loss of data storage on the disk.

During operation, the first cross bar 130, in conjunction with the first and second side rails 111 and 112, generates the first negative pressure zone 160. During operation, the second cross bar 140, in conjunction with the third and fourth side rails 113 and 114 and the first and second slanted walls 150 and 151, generates the second negative pressure zone 170. These separated negative pressure cavities 160 and 170 provide for a more distributed and stronger negative pressure than the single negative pressure cavity 17 of conventional NPAB sliders (See FIG. 2).

During operation, the first and second air channels 180 and 185 operate to reduce the roll angle variation with large skew change and to obtain easily constant flying height characteristics. Airflow is deflected to each side direction of the slider 100 through the two air channels 180 and 185, along the first and second slanted walls 150 and 151.

This construction also removes the drastic flow change around the second cross bar 140. Because the second cross bar 140 is smoothly connected to the rear side rail pair 113 and 114 via the first and second slanted walls 150 and 151, less particle accumulation occurs at the second cross bar 140, and so the negative pressure at the second cavity 170 can be more reserved with large skew angle variation. In fact, because there is no unique location in which airflow direction can be drastically changed in this embodiment, particle accumulation during slider flying is minimized.

While in a flying mode, the slider 100 of this embodiment experiences supporting positive forces at its four edges 111, 112, 113, and 114, and negative forces at the two central cavities 160 and 170. These forces are nicely balanced on the center of mass of the slider 100 and provide a more stable static and dynamic flying attitude for the slider 100 as it flies over the rotating disk.

The resulting combined pressure profile has high pressure near the leading end of the slider, a relatively low pressure in the middle of the slider, and a relatively high pressure near the trailing end of the slider. This design approach ensures that the minimum spacing between the slider and the disk, on which recording performance and head/disk interface reliability depend, is very insensitive to roll parameters. Furthermore, the high air bearing pressure at the two trailing ends of side rails, and at the two leading ends of the side rails ensures a sufficiently high air bearing pitch and a vertical stiffness with well distributed central negative forces. This design approach has made possible smaller-sized sliders than was feasible with conventional designs.

Figure 5:
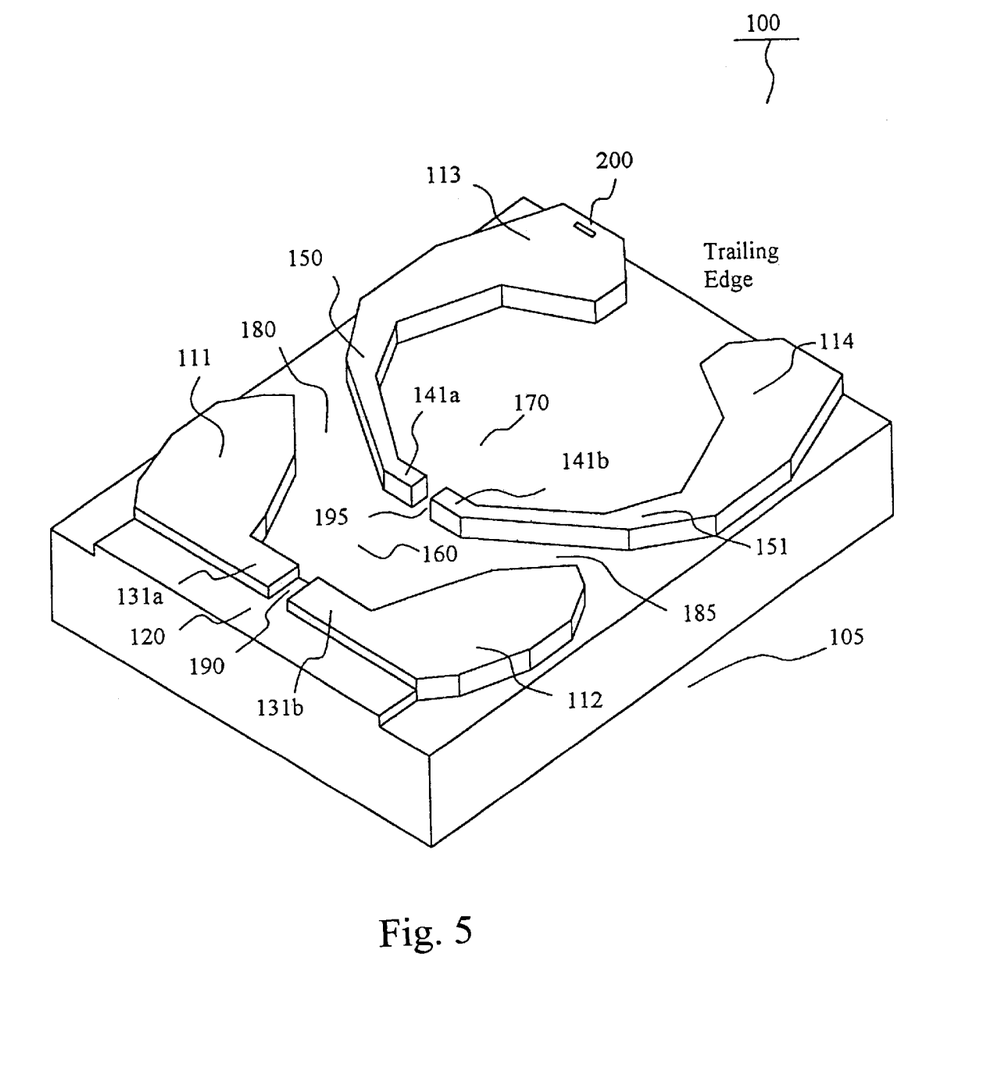
FIG. 5 is a bottom perspective view illustrating a negative pressure air bearing (NPAB) slider according to a second preferred embodiment of the present invention, which has air channels at dual cross bars.

FIG. 5 shows a second preferred embodiment of the present invention. This embodiment is similar to the first preferred embodiment, and like elements are identified with the same reference numbers. However, in the second preferred embodiment, the first and second cross bars are respectively separated by a first and second air channel 190 and 195, forming first and second split cross bars 131a and 131b, 141a and 141b. This embodiment acts to control the captured negative pressure amounts in the first and second negative pressure cavities 160 and 170.

The sizes of these two air channels 190 and 195 are preferably formed to optimally control the amounts of suction force generated at the two cavities 160 and 170. The sizes of air channels 190 and 195 need not be the same, and can be located at biased positions for better flying performance.

Figure 6:
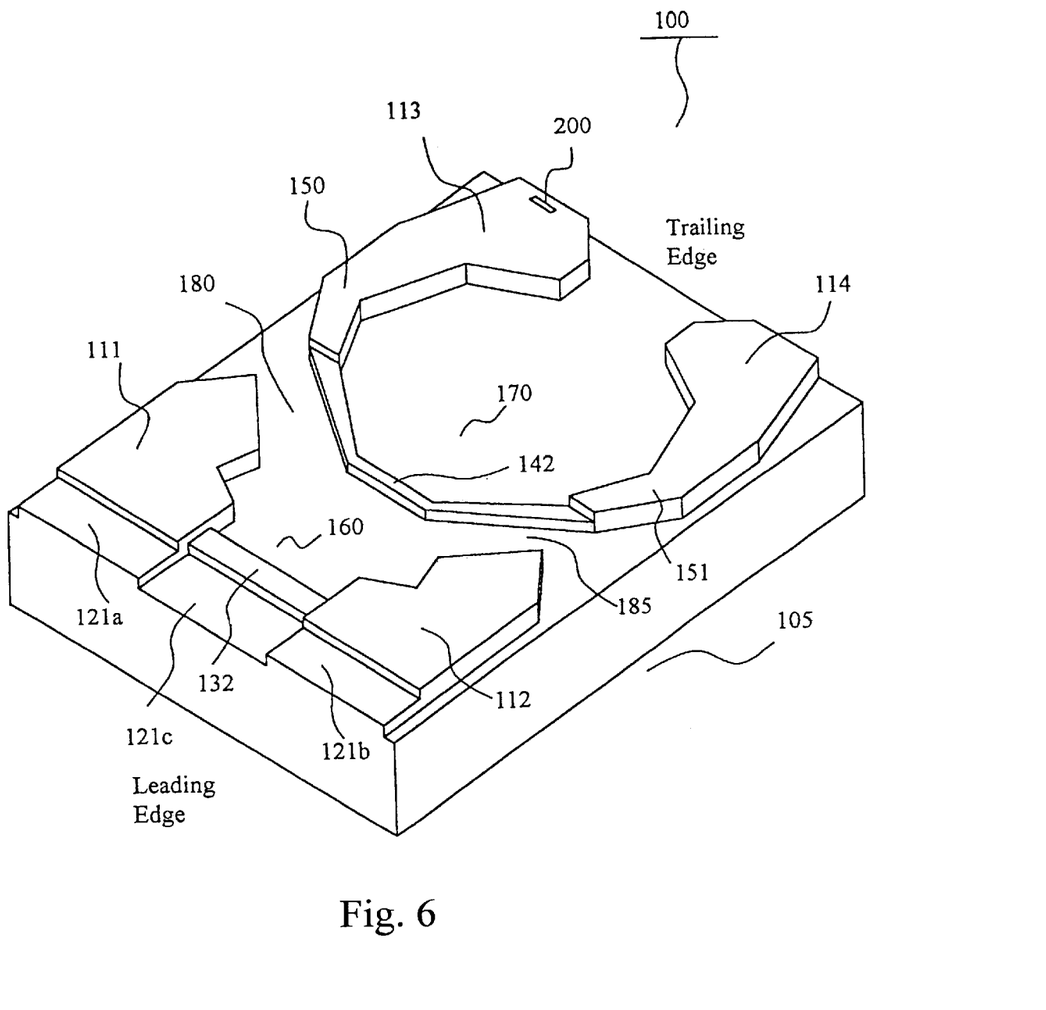
FIG. 6 is a bottom perspective view illustrating a negative pressure air bearing (NPAB) slider according to a third preferred embodiment of the present invention, which has shallow edge steps at dual cross bars.

FIG. 6 shows a third preferred embodiment of the present invention. As with the second preferred embodiment, this embodiment is similar to the first preferred embodiment, and like elements are identified with the same reference numbers. In the third preferred embodiment, the two cross bars 132 and 142 are shallowly etched to control the amount of negative force generated at the first and second negative pressure cavities 160 and 170.

This embodiment also may result in a split shallowly-etched step 121a, 121b, and 121c, in which the third split shallowly-etched step 121c is located between the first and second split shallowly-etched steps 121a and 121b, and is even more shallowly-etched than the first and second split shallowly-etched steps 121a and 121c.

These shallowly-etched cross bars 132 and 142 provide a similar result to two air channels 190 and 195 in the second preferred embodiment (See FIG. 5). Therefore, either the of the second or third embodiments may be chosen according to circumstances, i.e., the use of air channels 190 and 195, or the use of shallowly etched cross bars 132 and 142.

Figure 7:
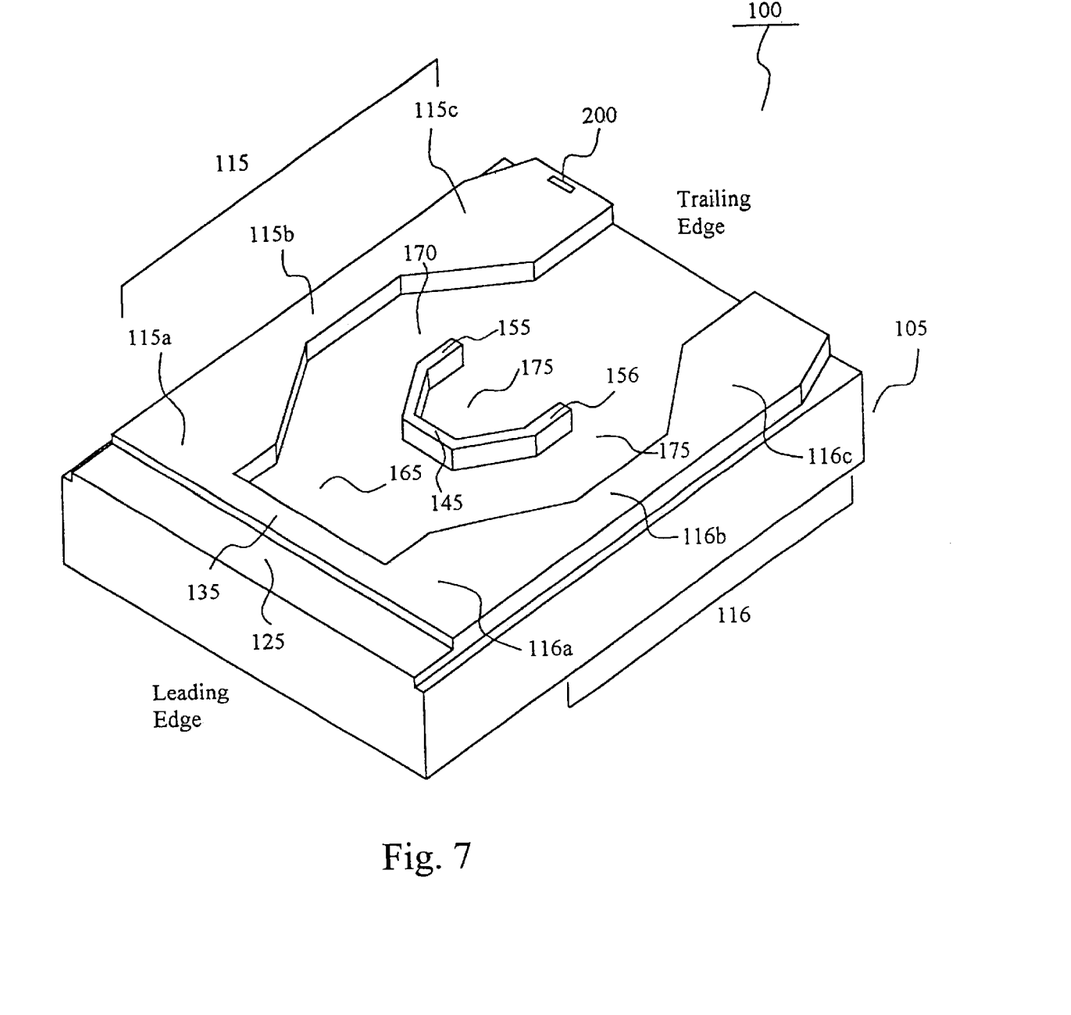
FIG. 7 is a bottom perspective view illustrating a negative pressure air bearing (NPAB) slider according to a fourth preferred embodiment of the present invention, which has an additional negative pressure pocket at the central section.

FIG. 7 shows a fourth preferred embodiment of the present invention. In accordance with the fourth preferred embodiment of the present invention, a slider 100 is provided for supporting a transducer 200 at the end of outer trailing rail 115. This slider 100 comprises primary outer and inner side rails 115 and 116, a primary cross bar (or cross rail) 135, a primary negative pressure zone 165, a shallowly-etched step 125, secondary inner and outer rails 155 and 156, a secondary cross bar (or cross rail) 145, and a secondary negative pressure zone 175. The transducer 200 is preferably is mounted at the rear portion of the outer rail 115 with reference to the disk rotation The primary outer and inner side rails 115 and 116 are each formed along a length of the slider body 105, and act to support the slider 100 during flying. Each side rail 115 and 116 includes a front, middle, and rear section 115a, 115b, 115c, and 116a, 116b, 116c. The middle portions 115b and 116b of the outer and inner side rails 115 and 116 are more narrow than their respective front and rear portions 115a and 115c, and 116a and 116c. These narrow middle sections 115b and 116b operate to reduce the roll angle variation with large skew change. They do so by creating the supporting force at the four edges of the slider 115a, 115c, 116a, and 116c. Since the supporting force is distributed at four edges, it provides very stable flying characteristics.

The primary cross bar 135 and the primary negative pressure zone 165 are located between the front portions 115a and 116a of the primary outer and inner side rails 15 and 116. The secondary cross bar 145 and the secondary negative pressure zone 175 are located between the secondary outer and inner side rails 155 and 156.

During slider flying, the shallowly-etched step 125 at the leading edge operates to squeeze the incoming airflow, and the primary cross bar 135 acts to generate a front negative force at the primary negative pressure zone 165. In addition, the secondary cross bar 145 acts to generate a rear negative force at the secondary negative pressure zone 175. As a result of this, two separate negative forces can be generated at the two negative pressure cavities 165 and 175.

The secondary cross bar 145 is preferably formed in the shape of an arc, and so provides a decreased possibility for the accumulation of debris at the cross bar 175.

In this embodiment, stronger and more distributed negative forces are generated around the central surface of the slider 100 than in conventional slider designs. As a result, this embodiment obtains an improved flying attitude.

Figure 8:
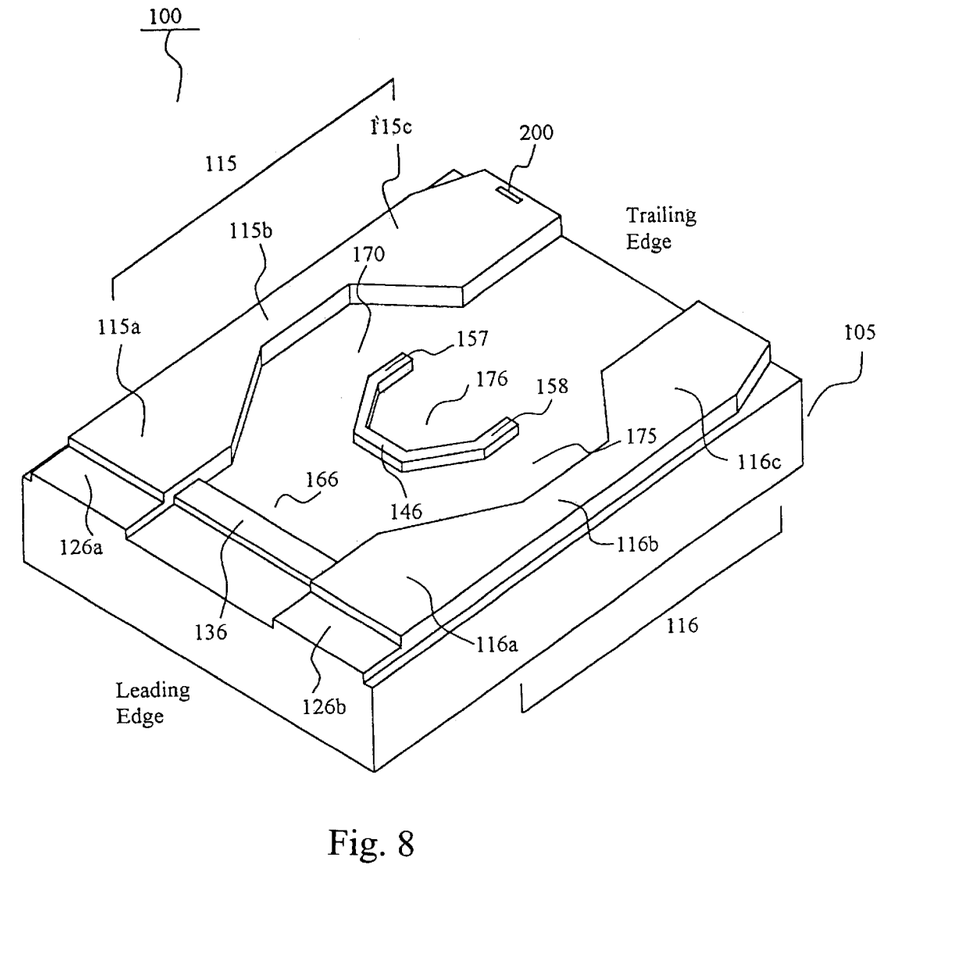
FIG. 8 is a bottom perspective view illustrating a negative pressure air bearing (NPAB) slider according to a fifth preferred embodiment of the present invention, which has shallowly-etched steps at dual cross bars.

FIG. 8 shows a fifth preferred embodiment of the present invention. This embodiment is similar to the fourth preferred embodiment, and like elements are identified with the same reference numbers. However, in the fifth preferred embodiment, the primary and secondary cross bars 136 and 146, along with the secondary inner and outer rails 157 and 158, are formed as shallowly-etched steps, to adjust negative force amounts at the two negative pressure cavities 166 and 176. This embodiment is used as another proper way to secure an optimal flying condition.

In alternate embodiments, central air channels at the primary and secondary cross bars 136 and 146 can also be used, as discussed with regard to the second preferred embodiment, to control force and moment distribution.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation ad illustrated and described. Hence, all suitable modifications and equivalents may be resorted to as falling within the scope of the invention.

What is claimed:

1. A negative pressure air bearing slider, comprising:

a slider body for flying above a surface of a recording disk during relative rotation of the recording disk, the slider body having a principal surface for confronting the disk surface, the principal surface having a lead portion, a rear portion, a first side portion and a second side portion, wherein the lead portion is spaced upstream of the rear portion relative to a longitudinal direction of the slider body which is coincident with a tangential rotational direction of the recording disk, and wherein the first side portion is spaced from the second side portion relative to a lateral direction of the slider body;

first and second projections extending from the lead portion of the principal surface of the slider to a midpoint of the slider, the first and second projections being spaced apart from each other in the lateral direction of the slider body;

a first cross bar formed between the first and second projections;

third and fourth projections extending from the midpoint of the principal surface of the slider to the rear portion of the slider, the third and fourth projections being spaced apart from each other in the lateral direction of the slider body;

a second cross bar formed between the third and the fourth projections; and a transducer mounted on one of the first through fourth projections so as to be suspended over the disk surface while the disk is rotating, wherein the first cross bar and the first and second projections define a first negative pressure air cavity for the slider body, and wherein the second cross bar and the third and fourth projections define a second negative pressure air cavity for the slider body.

2. A negative pressure air bearing slider, as recited in claim 1, further comprising:

first and second slanted walls, the first slanted wall being formed between the second cross bar and the third projection, and the second slanted wall being formed between the second cross bar and the fourth projection;

wherein the second cross bar, the first and second slanted walls, and the third and fourth projections define a second negative pressure air cavity for the slider body.

3. A negative pressure air bearing slider, as recited in claim 1, wherein the second cross bar and the first and second slanted walls form a convex shape, with respect to the lead portion of the slider.

4. A negative pressure air bearing slider, as recited in claim 1, further comprising a central shallowly-etched step formed proximate to the lead portion of the slider, the central shallowly-etched step having a height less than that of the first and second projections.

5. A negative pressure air bearing slider, as recited in claim 1, wherein the transducer is mounted on one of the third and fourth projections.

6. A negative pressure air bearing slider, as recited in claim 1, wherein the first cross bar has a first air channel formed in it to allow air to flow from the lead portion of the slider to the first negative pressure air cavity.

7. A negative pressure air bearing slider, as recited in claim 6, wherein the second cross bar has a second air channel formed in it to allow air to flow from the first negative pressure air cavity to the second negative pressure air cavity.

8. A negative pressure air bearing slider, as recited in claim 1, wherein the second cross bar has a second air channel formed in it to allow air to flow from the first negative pressure air cavity to the second negative pressure air cavity.

9. A negative pressure air bearing slider, as recited in claim 1, wherein the first and third projections define a third air channel from the first negative pressure air cavity to the first side portion, and wherein the second and fourth projections define a fourth air channel from the first negative pressure air cavity to the second side portion.

10. A negative pressure air bearing slider, as recited in claim 1, wherein the first cross bar is shallowly etched to regulate the flow of air from the lead portion to the first negative pressure air cavity.

11. A negative pressure air bearing slider, as recited in claim 1, wherein the second cross bar is shallowly etched to regulate the flow of air from the first negative pressure air cavity to the second negative pressure air cavity.

12. A negative pressure air bearing slider, comprising:

a slider body for flying above a surface of a recording disk during relative rotation of the recording disk, the slider body having a principal surface for confronting the disk surface, the principal surface having a lead portion, a rear portion, a first side portion and a second side portion, wherein the lead portion is spaced upstream of the rear portion relative to a longitudinal direction of the slider body which is coincident with a tangential rotational direction of the recording disk, and wherein the first side portion is spaced from the second side portion relative to a lateral direction of the slider body;

first and second primary projections extending from the lead portion of the principal surface of the slider to the rear portion of the slider, the first and second primary projections being spaced apart from each other in the lateral direction of the slider body, the first and second primary projections each including a front section proximate to the lead portion, a rear section proximate to the rear portion, and a middle section between the front and rear sections, the middle section being more narrow than either of the front or rear sections;

a primary cross bar placed between the front sections of the first and second primary projections;

first and second secondary projections, being smaller in length than the first and second primary projections, being spaced apart from each other in the lateral direction of the slider body, and being placed proximate to the middle sections of the first and second primary projections;

a secondary cross bar placed between the first and second secondary projections, in the direction facing the lead portion; and a transducer mounted on one of the first and second projections so as to be suspended over the disk surface while the disk is rotating, wherein the primary cross bar and the first and second primary projections define a primary negative pressure air cavity for the slider body, and wherein the secondary cross bar and the first and second secondary projections define a secondary negative pressure air cavity for the slider body.

13. A negative pressure air bearing slider, as recited in claim 12, wherein the secondary cross bar is convex with respect to the lead portion of the slider.

14. A negative pressure air bearing slider, as recited in claim 12, further comprising a central shallowly-etched step, having a height less than that of the first and second projections, formed proximate to the lead portion of the slider.

15. A negative pressure air bearing slider, as recited in claim 12, wherein the primary cross bar has a primary air channel formed in it to allow air to flow from the lead portion of the slider to the primary negative pressure air cavity.

16. A negative pressure air bearing slider, as recited in claim 12, wherein the secondary cross bar has a secondary air channel formed in it to allow air to flow from the primary negative pressure air cavity to the secondary negative pressure air cavity.

17. A negative pressure air bearing slider, as recited in claim 12, wherein the first primary projection and the first secondary projection define a first air channel from the primary negative pressure air cavity to the rear portion, and wherein the second primary projection and the second secondary projection define a second air channel from the first negative pressure air cavity to the rear portion.

18. A negative pressure air bearing slider, as recited in claim 12, wherein the primary cross bar is shallowly etched to regulate the flow of air from the lead portion to the primary negative pressure air cavity.

19. A negative pressure air bearing slider, as recited in claim 12, wherein the secondary cross bar is shallowly etched to regulate the flow of air from the primary negative pressure air cavity to the secondary negative pressure air cavity.

20. A negative pressure air bearing slider, comprising:

a slider body, for flying above a surface of a recording disk during relative rotation of the recording disk, the slider body having a lead portion and a rear portion;

first and second projections formed on the slider body, the first and second projections being spaced apart from each other in a lateral direction of the slider body, and providing a plurality of positive forces to support the slider over the disk;

a first cross bar formed between the first and second projections;

a first negative pressure air cavity proximate to the lead portion for providing a first negative force, pulling down the slider towards the disk;

a second negative pressure air cavity proximate to the rear portion for providing a second negative force, pulling down the slider towards the disk; and a transducer mounted on one of the first and second projections so as to be suspended over the disk surface while the disk is rotating.

21. A negative pressure air bearing slider, as recited in claim 20, wherein the plurality of positive forces and the first and second negative forces are balanced around the center of mass of the slider to keep the slider at a constant height over the disk.

* * * * *